United States Patent
Wyszka et al.

(10) Patent No.: US 12,014,448 B2
(45) Date of Patent: Jun. 18, 2024

(54) PARK ASSISTANCE SYSTEM FOR A MOTOR VEHICLE

(71) Applicant: Volkswagen Aktiengesellschaft, Wolfsburg (DE)

(72) Inventors: Robert Jan Wyszka, Hannover (DE); Daniel Morales Fernández, Braunschweig (DE); Adrian Haar, Hannover (DE); Michael Wittkämper, Braunschweig (DE); Pia Kodalle, Osnabrück (DE); Kevin Thiel, Potsdam (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 86 days.

(21) Appl. No.: 17/607,951

(22) PCT Filed: Apr. 1, 2020

(86) PCT No.: PCT/EP2020/059315
§ 371 (c)(1),
(2) Date: Nov. 1, 2021

(87) PCT Pub. No.: WO2020/224877
PCT Pub. Date: Nov. 12, 2020

(65) Prior Publication Data
US 2022/0277496 A1    Sep. 1, 2022

(30) Foreign Application Priority Data

May 6, 2019    (DE) .................... 10 2019 206 490.6

(51) Int. Cl.
*G06T 11/00*    (2006.01)
*B60K 35/00*    (2024.01)
(Continued)

(52) U.S. Cl.
CPC ............ *G06T 11/001* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS

| 8,965,678 B2 * | 2/2015 | Herrmann | B60K 35/00 340/904 |
| 9,792,785 B2 * | 10/2017 | Rittger | G08G 1/168 |

(Continued)

FOREIGN PATENT DOCUMENTS

| CN | 102910130 A | 2/2013 | ............. B60R 21/01 |
| CN | 106945521 A | 7/2017 | ............. B60K 35/00 |

(Continued)

OTHER PUBLICATIONS

German Office Action, Application No. 102019206490.6, 6 pages, Aug. 29, 2019.
(Continued)

*Primary Examiner* — Jason A Pringle-Parker
(74) *Attorney, Agent, or Firm* — Slayden Grubert Beard PLLC

(57) ABSTRACT

A park assistance system for a motor vehicle is presented that has a distance sensor system for generating a sensor signal depending on a lateral distance to an object. A computing unit of the park assistance system generates graphics data based on the sensor signal, and contains an augmented reality system for superimposing a graphic element onto a field of view of a driver. An extension of the graphic element along a vertical axis depends on a value of the distance.

13 Claims, 2 Drawing Sheets

(51) Int. Cl.
*B60K 35/23* (2024.01)
*B60K 35/28* (2024.01)
*G02B 27/01* (2006.01)
*G08G 1/16* (2006.01)

(52) U.S. Cl.
CPC .............. *G08G 1/168* (2013.01); *B60K 35/23* (2024.01); *B60K 35/28* (2024.01); *B60K 2360/177* (2024.01); *B60K 2360/179* (2024.01); *G02B 2027/0138* (2013.01); *G02B 2027/014* (2013.01); *G02B 2027/0141* (2013.01)

(56) References Cited

U.S. PATENT DOCUMENTS

| | | | | |
|---|---|---|---|---|
| 2008/0100614 | A1* | 5/2008 | Augst | G06T 19/006 345/419 |
| 2010/0253918 | A1* | 10/2010 | Seder | G01S 13/867 353/13 |
| 2013/0158851 | A1* | 6/2013 | Herrmann | G08G 1/168 701/300 |
| 2016/0170487 | A1* | 6/2016 | Saisho | B60K 35/00 345/156 |
| 2016/0200249 | A1* | 7/2016 | Boyd | B60Q 9/00 340/459 |
| 2016/0327402 | A1* | 11/2016 | Funabiki | G08G 1/09623 |
| 2016/0327790 | A1 | 11/2016 | Kasano | 345/633 |
| 2017/0192091 | A1 | 7/2017 | Felix | |
| 2017/0355307 | A1* | 12/2017 | Ha | G08G 1/143 |
| 2018/0029641 | A1* | 2/2018 | Solar | G01S 17/931 |
| 2018/0061134 | A1* | 3/2018 | Ota | B60R 1/00 |
| 2018/0105173 | A1* | 4/2018 | Yamada | G06T 3/4038 |
| 2018/0157036 | A1* | 6/2018 | Choi | G02B 27/0179 |
| 2019/0294895 | A1* | 9/2019 | Kleen | G02B 27/01 |
| 2019/0299855 | A1* | 10/2019 | Ostapenko | G08G 1/166 |
| 2020/0247412 | A1* | 8/2020 | Wang | G02B 27/01 |
| 2020/0307616 | A1* | 10/2020 | Nithiyanantham | G02B 27/0101 |
| 2021/0197669 | A1* | 7/2021 | Jeong | B60K 35/00 |

FOREIGN PATENT DOCUMENTS

| | | | | |
|---|---|---|---|---|
| DE | 102007042966 | A1 | 4/2009 | ............ B60Q 1/48 |
| DE | 102010025354 | A1 | 12/2011 | ............ B60R 1/00 |
| DE | 102012017931 | A1 | 3/2013 | ............ B60R 16/02 |
| DE | 102011121285 | A1 | 6/2013 | ............ B60Q 1/48 |
| DE | 102011121763 | A1 | 6/2013 | ............ B60K 35/00 |
| DE | 102013206435 | A1 | 10/2014 | ............ B60R 1/10 |
| DE | 102014118395 | A1 | 6/2016 | ............ B60R 1/10 |
| DE | 102019206490 | B3 | 3/2020 | ............ B60K 35/00 |
| EP | 3351417 | A1 | 7/2018 | ............ B60K 35/00 |
| WO | 2020/224877 | A1 | 11/2020 | ............ G02B 27/01 |

OTHER PUBLICATIONS

International Search Report and Written Opinion, Application No. PCT/EP2020/059315, 7 pages, Jul. 23, 2020.

Chinese Office Action, Application No. 202080034076.X, 7 pages, Nov. 30, 2023.

* cited by examiner

PARK ASSISTANCE SYSTEM FOR A MOTOR VEHICLE

CROSS-REFERENCE TO RELATED APPLICATIONS

This application claims priority to German Patent Application No. DE 10 2019 206 490.6, filed on May 6, 2019 with the German Patent and Trademark Office. The contents of the aforesaid Patent Application are incorporated herein for all purposes.

TECHNICAL FIELD

The invention relates to a park assistance system for a motor vehicle having a distance sensor system to generate a sensor signal depending on a lateral distance between the motor vehicle and an object in an environment of the motor vehicle, and a computing unit to generate graphics data based on the sensor signal. The invention furthermore relates to a method for helping with parking a motor vehicle, a computer program, and a computer-readable storage medium.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

When helping a motor vehicle with parking, ultrasonic sensors, optical sensors, or cameras are used. In known park assistance systems, the spacing information is displayed in the form of lateral spacing indicators on an infotainment system of the motor vehicle. The driver of the motor vehicle must therefore remove his gaze from the road and direct it to the display within the automobile. In addition, the driver must interpret the actual distance between the motor vehicle and a potential obstacle based on the displayed information, which may lead to misestimations. Both circumstances lead to an endangerment of the driver's safety.

SUMMARY

A need exists to provide improved systems and methods for parking a motor vehicle by means of which safety for a driver of the motor vehicle is increased.

The need is addressed by a park assistance system, a method for helping with parking, a computer program, as well as a computer-readable storage medium according to the independent claims. Embodiments of the invention are described in the dependent claims, the following description, and the drawings.

DESCRIPTION

Figure 1:
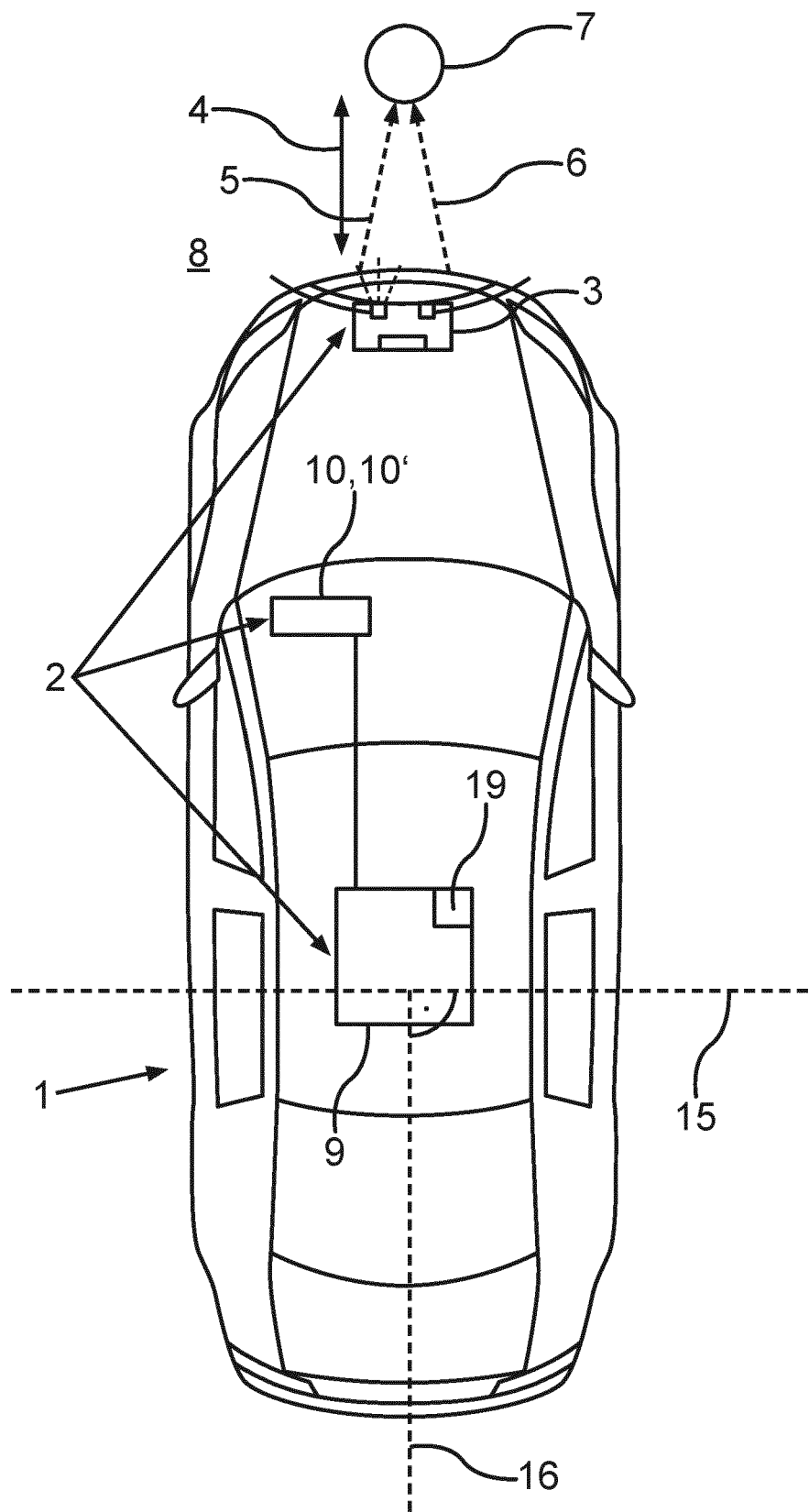
FIG. 1 shows a motor vehicle with an exemplary embodiment of a park assistance system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein are based on the idea of superimposing a graphic element by means of an augmented reality system onto a field of view of the driver so that an extension of the graphic element along a vertical axis depends on a value of a lateral distance between the motor vehicle and an object in the environment of the motor vehicle.

In a first exemplary aspect, a park assistance system is presented for a motor vehicle that has a distance sensor system and a computing unit. The distance sensor system is configured to generate a sensor signal depending on a lateral distance between the motor vehicle and an object in an environment of the motor vehicle. The computing unit is configured to generate graphics data based on the sensor signal. The park assistance system moreover contains an augmented reality system (AR system). The AR system is configured to superimpose a graphic element onto a field of view of a driver of the motor vehicle, in particular to project it onto a display element of the AR system or the motor vehicle, or to display it on the display element. An extension of the graphic element along a vertical axis depends on a value of the distance.

The lateral distance may in particular be a spacing or distance within a plane parallel to a plane of movement of the motor vehicle, wherein the plane of movement of the motor vehicle corresponds to a plane within which the motor vehicle may move, i.e., in particular parallel to a plane of a surface on which the motor vehicle is moving. The motor vehicle has in particular a longitudinal axis and a transverse axis. The plane of movement of the motor vehicle is then defined in that the longitudinal and transverse direction of the motor vehicle lie within the plane of movement.

The distance sensor system may for example contain a camera system, an active optical sensor system or an ultrasonic sensor system, in particular an active ultrasonic sensor system. The active optical sensor system is for example configured to emit light and to detect reflected components of the light, and to determine the lateral distance based on the reflected components. Analogously, the ultrasonic sensor system may for example be configured to send ultrasonic waves into the environment, to detect reflected components of the ultrasonic waves, and to determine the lateral distance based thereupon.

The graphics data include for example data or information present in a suitable form so that the computing unit, or respectively the AR system, may generate the graphic element based on the graphic data and superimpose it onto the field of view, in particular depict it on the display element. The graphics data may for example be in the form of a graphics file, or in another suitable form.

The field of view of the driver is in particular a spatial region that the driver may visually perceive. Depending on the embodiment of the AR system, the field of view may correspond to an actual field of view of the driver, i.e., a spatial region that the driver may actually perceive visually independent on the direction in which, for example, his head has rotated. Alternatively in other embodiments, the field of view may correspond to a nominal field of view of the driver, i.e., a field of view of the driver when he has oriented his head in a given, in particular nominal direction and directs his gaze in this direction. The nominal direction may for example correspond to a direction from a given position within the cockpit through the windshield of the motor vehicle toward the road, or respectively into the environment of the motor vehicle.

The AR system contains for example all of the components that are needed to generate the graphic element and to superimpose the graphic element onto the field of view of the driver based on the graphics data. In particular, the AR system may also contain the display element. For example, the computing unit may also be part of the AR system.

The display element may for example correspond to a windshield of the motor vehicle, or to a part of the windshield. Alternatively, the display element may also be designed as a separate display or separate display surface of the AR system.

For example, the AR system may be designed as a head-up display or as a head-mounted display.

An augmented reality system or AR system may be understood to be a system by means of which images of the real environment detected by the driver are supplemented by computer-generated additional information or virtual objects, in particular by the graphic element, by means of superimposing or overlaying.

The extension of the graphic element may in particular be a length of the graphic element along the vertical axis.

The vertical axis is in particular an axis that runs vertically from the perspective of the driver, i.e., from bottom to top or vice versa in the field of view of the driver, in particular when the driver has directed his gaze to the graphic element or the display. In particular, the vertical axis corresponds to an axis that stands upright on the longitudinal or transverse axis of the motor vehicle when the driver gazes in the driving direction, or in a direction parallel to the plane of movement of the motor vehicle.

In particular, the direction of the vertical axis deviates from a connecting axis between the distance sensor system and the object.

The graphic element may in particular be an abstract graphic element, i.e., in particular not a depiction of a real existing object.

With a park assistance system according to the teachings herein, the driver does not have to remove his gaze from the road in order to be able to detect the graphic element, or respectively its extension along the vertical axis, and accordingly a value of the distance between the motor vehicle and the object. This is possible by superimposing the graphic element onto the field of view of the driver. This improves the safety of the driver.

Since the graphic element is in particular an abstract graphic element, a meaning of the graphic element does not have to be explicitly understood. In particular in comparison to a camera image, a detailed interpretation of the graphic element is unnecessary since the extension of the graphic element as an indicator of the value of the distance may be intuitively detected by the driver, in particular after a certain familiarization phase. In contrast, an actual spacing from a camera image of the environment needs to be interpreted and may be difficult to estimate.

Since the extension of the graphic element along the vertical axis is used as an indicator of the lateral distance, the visual axis is effectively tilted out of the plane of movement of the motor vehicle. In particular, this allows a close range in an immediate environment of the distance sensor system to be completely depicted. This is in particular beneficial because AR systems such as head-up displays or head-mounted displays may have a minimum distance, wherein objects within the minimum distance cannot be depicted. The region of the minimum distance may for example end a few meters from the motor vehicle in head-up displays so that, in particular, a close range of the environment of the motor vehicle may also be intuitively and reliably depicted by means of the teachings herein.

In some embodiments of the park assistance system, the extension of the graphic element along the vertical axis is all the more smaller the smaller the value of the lateral distance is.

In some embodiments of the park assistance system, the AR system is configured to superimpose another graphic element onto the field of view of the driver, in particular to depict it on the display element or project it onto the display element. An extension of the additional graphic element along the vertical axis also depends on the value of the distance. A spacing between the graphic element and the additional graphic element depends on the value of the distance.

In particular, the spacing between the graphic element and the additional graphic element may be all the more smaller the smaller the value of the distance is.

In some embodiments, the graphic element and the additional graphic element may be polygons such as rectangles or trapezoids. The extension of the polygons along the vertical axis then corresponds to a particular side length or height of the polygon.

In particular, the extension of the graphic element along the vertical axis may be the same as the extension of the additional graphic element along the vertical axis.

By superimposing the additional graphic element and scaling the spacing between the graphic elements and the value of the distance, a more intuitive and therefore safer depiction may be enabled.

In some embodiments, the AR system is configured to superimpose the graphic element and, if applicable, the additional graphic element onto the field of view according to a given color scheme such that the color of the graphic element and, if applicable, the additional graphic element depends on a value of the distance.

By depicting the graphic elements according to the color scheme, an even more intuitive and therefore even safer representation of the lateral distance may be achieved.

In some embodiments, the AR system contains a head-up display system for superimposing the graphic element, and if applicable the additional element, onto the field of view.

In such embodiments, in particular the windshield of the motor vehicle may serve as a display element.

In particular when a head-up display system is used, the advantage of the teachings herein is particularly evident since, in a lateral depiction of the distance by means of a head-up display, a region of around 5 to 7 m directly in front of the motor vehicle cannot be imaged due to a corresponding blind spot of the head-up display. For head-up displays, use as a park assistance system is only meaningfully possible by tilting the visual axis out of the lateral plane into the vertical direction according to the present aspect.

In some embodiments, the AR system contains a visual output unit that may be worn on one's head for superimposing the graphic element, and in particular the additional graphic element, onto the field of view.

The visual output unit that may be worn on one's head (head-mounted display, HMD) is in particular a so-called AR glasses system, also termed data glasses or smart glasses.

In such embodiments, for example a display element that may be fastened to the head of the driver serves as a display element for superimposing the graphic elements.

According to another exemplary aspect, a method is presented for helping with parking a motor vehicle, wherein a sensor system is generated by means of a distance sensor system of the motor vehicle depending on a lateral distance between the motor vehicle and an object in an environment of the motor vehicle. By means of a computing unit, graphic data are generated based on the sensor system. A graphic element is superimposed by means of an augmented reality system of the motor vehicle onto a field of view of a driver of the motor vehicle, wherein the graphic element is superimposed onto the field of view such that its extension along a vertical axis depends on a value of the distance.

In some embodiments of the method for helping with parking, another graphic element is superimposed onto the field of view by means of the augmented reality system. An extension of the additional graphic element along the vertical axis depends on the value of the distance, and a spacing between the graphic element and the additional graphic element depends on the value of the distance.

Other embodiments of the method for helping with parking follow directly from the different embodiments of the park assistance system according to the teachings herein, and vice versa. In particular, a park assistance system according to the teachings herein may be configured or programmed to perform a method for helping with parking according to the teachings herein, or a park assistance system according to the teachings herein performs a method according to the teachings herein.

According to another exemplary aspect, a motor vehicle having a park assistance system according to the teachings herein is presented.

According to another exemplary aspect, a computer program with commands is presented, wherein when the computer program is run by a park assistance system according to the teachings herein, in particular by a computing unit of a park assist system, the commands of the computer program cause the park assistance system to perform a method according to the teachings herein.

According to another exemplary aspect, a computer-readable storage medium is presented on which a computer program according to the teachings herein is saved.

Also belonging to the invention are embodiments of the method that have features which have already been described in conjunction with the embodiments of the park assistance system. For this reason, the corresponding embodiments of the method will not again be described.

The invention also includes combinations of the features of the described embodiments.

In the following, further exemplary embodiments of the invention are described.

In the exemplary embodiments described herein, the described components of the embodiments each represent individual features that are to be considered independent of one another, in the combination as shown or described, and in combinations other than shown or described. In addition, the described embodiments may also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a motor vehicle 1 that has a park assistance system 2. The park assistance system 2 has a distance sensor system 3 that for example may be designed as an active optical sensor system, for example as a lidar system, or as a radar, ultrasound or camera system. In the present example, the distance sensor system 3 is for example designed as a lidar system. The distance sensor system 3 is then configured to emit light pulses 5, in particular into an environment 8 of the motor vehicle 1, and to detect components 6 of the light pulses 5 that for example were reflected by an object 7 within the environment 8. Based on the reflected components 6, for example an intensity of the reflected components 6 and/or a propagation time of the reflected components 6, the distance sensor system 3 may generate a sensor signal that represents a lateral distance 4 between the motor vehicle 1 and the object 7.

The lateral distance 4 is in particular a spacing between the motor vehicle 1 and object 7 within a plane that is parallel to a plane of movement of the motor vehicle, wherein the plane of movement lies between a longitudinal axis 16 of the motor vehicle 1 and a transverse axis 15 of the motor vehicle 1.

The park assistance system 2 also has a computing unit 9 that is connected or coupled to the distance sensor system 3 in order to receive the sensor signal, as well as an AR system 10 that for example is designed as a head-up display and is also coupled to the computing unit 9.

The AR system 10 may in particular have an imaging unit which may generate an image based on given image or graphics data by generating corresponding light signals. The AR system 10 may moreover include a projection surface 10' that for example includes a part of the windshield of the motor vehicle 1. Moreover, the AR system 10 may have an optics unit which is configured to project the image generated by the imaging unit onto the projection surface 10'. The AR system 10 may therefore project an image or a graphic element onto the part of the windshield, and therefore into the field of view of the driver of the motor vehicle 1.

The computing unit 9 or the park assistance system 2 may optionally include a computer-readable storage medium 19 on which for example a computer program according to the teachings herein is saved that, while being run by the computing unit 9, causes the park assistance system 2 to execute a method for helping with parking according to the teachings herein.

While the park assistance system 2 is operating, it may actuate the distance sensor system 3 to execute a method for helping with parking according to the teachings herein in order to determine the lateral distance 4 between the motor vehicle 1 and the object 7, or respectively to generate a sensor signal based on the distance and transmit it to the computing unit 9. Based on the sensor signal, the computing unit 9 may generate graphics data that, for example, may be transmitted to the AR system 10 in the form of control commands or a graphics file.

The imaging unit of the AR system 10 may generate a corresponding image based on the graphics data and, by means of the optics unit, superimpose one or more graphic elements 11, 12, 13, 14 onto the projection surface 10' onto the field of view of the driver. The graphic elements 11, 12, 13, 14 are in particular superimposed onto the field of view of the driver such that their extension along a vertical axis 17 in the field of view of the driver depends on the lateral distance 4.

Figure 2:
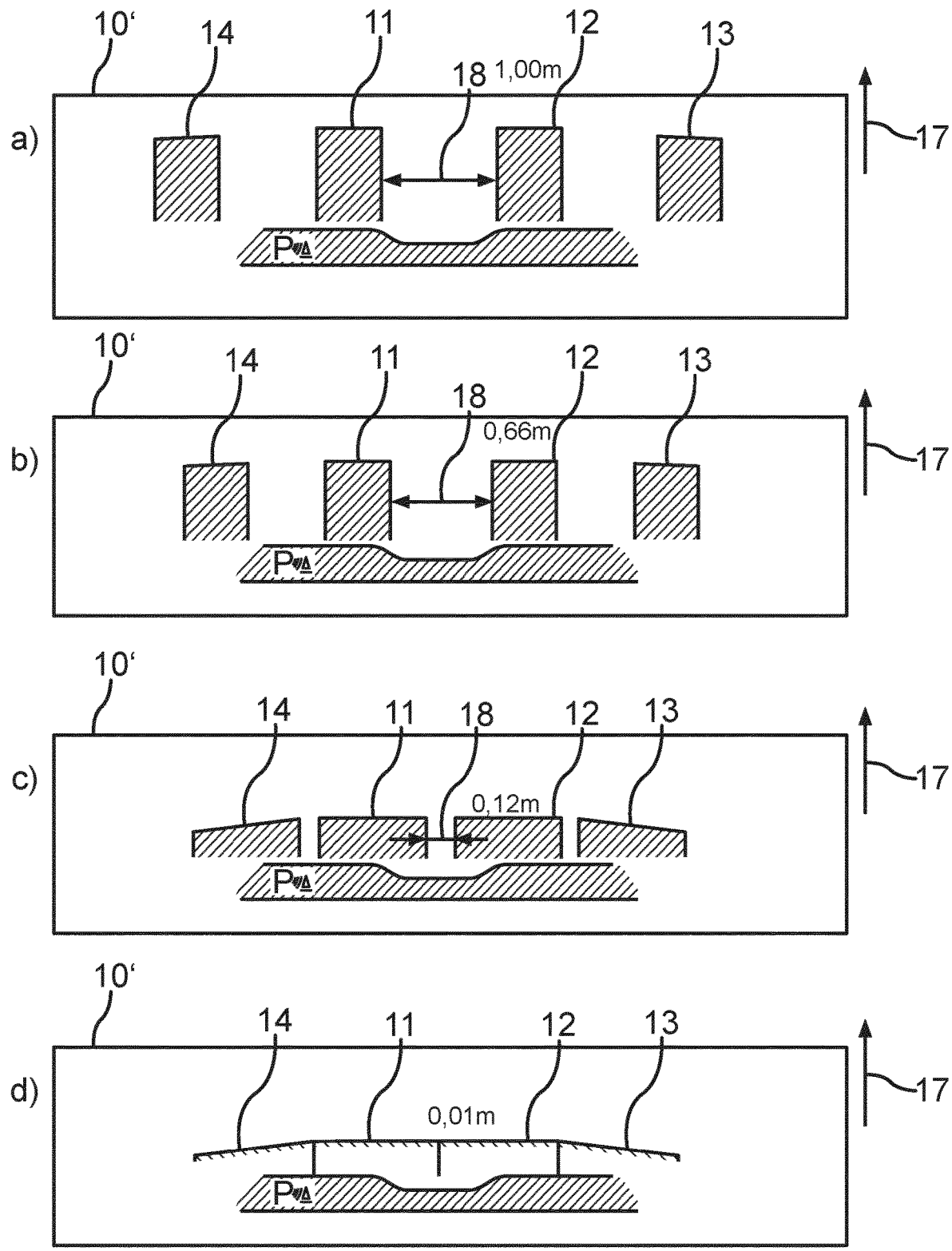
FIG. 2 shows different situations in an exemplary embodiment of a method.

FIG. 2 shows four images a), b), c) and d) in which the projection surface 10' of the AR system 10 in different situations, in particular with different lateral distances 4, as well as the correspondingly superimposed graphic elements in the different situations 11, 12, 13, 14 are depicted.

In image a) in FIG. 2, four bars 11, 12, 13, 14 arranged next to each other at a respective spacing 18 are depicted as graphic elements. For example, 1 m was determined as the lateral distance 4. The extension, or respectively the length of the graphic elements 11, 12, 13, 14 along the vertical axis 17, has a corresponding value of 1 m assigned to the lateral distance 4.

In the image b) in FIG. 2, a situation of the projection surface 10' is depicted in which the lateral distance 4 of 0.66 m was determined. Correspondingly, the extension of the graphic elements 11, 12, 13, 14 along the vertical axis 17 is less than in the image a).

Optionally, the spacing 18 between the individual graphic elements 11, 12, 13, 14 in image b) may be less than in image a) and therefore reflect the lesser lateral distance 4.

In image c), the projection surface 10' is shown in another situation in which for example 0.12 m was determined as the lateral distance 4. Correspondingly, the graphic elements 11, 12, 13, 14 are again depicted with a lesser extension along the vertical axis 17 in comparison to image b), and optionally again with a reduced respective spacing 18 in comparison to image b) in order to visually depict the smaller lateral distance 4.

In the image d) in FIG. 2, another situation of the projection surface 10' is depicted in which for example 0.01 m was determined as the lateral distance 4. Correspondingly, the graphic elements 11, 12, 13, 14 are depicted with an even smaller extension along the vertical axis 17 than in image c), and optionally with an even smaller spacing 18 to depicting the again lesser lateral distance 4.

Optionally, the graphic elements 11, 12, 13, 14 in the different images a), b), c) and d) may be depicted in different colors or shades. In doing so, signal colors may be used to intuitively depict an impending collision as being even more immediate by very short distances.

For example in image a), the graphic elements 11, 12, 13, 14 may be depicted in a neutral color such as blue, gray, or green. In images b) and c), the graphic elements 11, 12, 13, 14 may for example be depicted in yellow or orange tones. In image d), the graphic elements 11, 12, 13, 14 may for example be depicted in red tones.

The teachings herein make it possible to safely help with parking a motor vehicle. On one hand, the safety of the driver may be improved by superimposing the corresponding information onto the field of view of the driver. To be able to completely depict the superimposing of the information by an AR system, the visual axis along which the spacing is measured is tilted out of a lateral plane in a vertical direction of the field of view of the driver so that one effectively switches from a perspective view to a birds-eye view. In particular, this also allows a close range of the motor vehicle to be completely or almost completely imaged using the AR system. By depicting the graphic element with an extension along the vertical axis that depends on the lateral distance, the driver does not have to divert his gaze from the road to detect the information, and a depicted situation does not have to be interpreted as with a camera image. The perception of the information is thereby more immediate and intuitive, and the driver may therefore process the information faster, which results in increased safety. Particularly in tight situations, the teachings herein may contribute to the driver being able to better estimate the distance between the motor vehicle and obstacle and thereby help optimally exploit the available parking space.

LIST OF REFERENCE NUMERALS

1 Motor vehicle
2 Park assistance system
3 Distance sensor system
4 Lateral distance
5 Light
6 Reflected components
7 Object
8 Environment
9 Computing unit
10 Augmented reality system
10' Projection surface
11, 12, 13, 14 Graphic elements
15 Transverse axis
16 Longitudinal axis
17 Vertical axis
18 Spacing
19 Storage medium The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

What is claimed is:

1. A park assistance system for a motor vehicle, comprising:
   a distance sensor that is activated while the motor vehicle engages a parking sequence and generates a sensor signal depending on a distance between the motor vehicle and an object having a fixed position in an environment of the motor vehicle; and
   a processor that is configured to generate graphics data based on the sensor signal; and
   an augmented reality system configured to superimpose a first graphic element and a second graphic element onto a field of view of a driver of the motor vehicle during the parking sequence;
   wherein the first graphic element and the second graphic element are separated by a space with a width corresponding to a value of the distance and the space is centered in the field of view of the driver;
   an extension of the first graphic element along a vertical axis depends on a value of the distance and an extension of the second graphic element along the vertical axis matches the extension of the first graphic element; and the width of the space shrinks and the extension of the first graphic element and the extension of the second graphic element shrink in unison as the value of the distance decreases.

2. The park assistance system of claim 1, wherein the augmented reality system is configured to superimpose the first graphic element onto the field of view according to a given color scheme such that the color of the first graphic element depends on the value of the distance.

3. The park assistance system of claim 1, wherein the augmented reality system is configured to superimpose the first graphic element onto the field of view according to a given color scheme such that the color of the first graphic element depends on the value of the distance.

4. The park assistance system of claim 1, wherein the augmented reality system comprises a head-up display system to superimpose the first graphic element onto the field of view.

5. The park assistance system of claim 1, wherein the augmented reality system comprises a visual output unit that may be worn on a head to superimpose the first graphic element onto the field of view.

6. The park assistance system of claim 1, wherein the augmented reality system is configured to superimpose the first graphic element onto the field of view according to a given color scheme such that the color of the graphic element depends on the value of the distance.

7. The park assistance system of claim 6, wherein the augmented reality system comprises a head-up display system to superimpose the first graphic element onto the field of view.

8. The park assistance system of claim 6, wherein the augmented reality system comprises a visual output unit that may be worn on a head to superimpose the first graphic element onto the field of view.

9. The park assistance system of claim 1, wherein the augmented reality system comprises a head-up display system to superimpose the first graphic element onto the field of view.

10. The park assistance system of claim 1, wherein the augmented reality system comprises a visual output unit that may be worn on a head to superimpose the first graphic element onto the field of view.

11. The park assistance system of claim 1, wherein an extension of the second graphic element along the vertical axis depends on the value of the distance.

12. A method for assisting parking a motor vehicle, comprising:

in response to entering a parking sequence, activating a distance sensor of the motor vehicle to generate a sensor signal indicating a lateral distance between the motor vehicle and an object having a fixed position in an environment of the motor vehicle;

based on the sensor signal, generating graphics data; and superimposing a first graphic element and a second graphic element separated by a space onto a field of view of a driver of the motor vehicle during the parking sequence;

wherein the space is centered in the field of view and has a width depending on a value of the lateral distance;

wherein the first graphic element and the second graphic element are superimposed onto the field of view such that a respective extension along a vertical axis depends on the value of the distance; and the width of the space shrinks and the extension of the first graphic element and the extension of the second graphic element shrink in unison as the value of the distance decreases.

13. A non-transitory storage medium having instructions that, when the instructions are being executed by a park assistance system, cause the park assistance system to:

activate a distance sensor of the motor vehicle during a parking sequence, generate a sensor signal depending on a lateral distance between the motor vehicle and an object having a fixed location in an environment of the motor vehicle;

based on the sensor signal, generate graphics data; and superimpose a first graphic element and a second graphic element onto a field of view of a driver of the motor vehicle;

wherein the first graphic element and the second graphic element are separated by a space with a width corresponding to a value of the distance and the space is centered in the field of view of the driver;

the first graphic element is superimposed onto the field of view such that its extension along a vertical axis depends on a value of the distance and an extension of the second graphic element along the vertical axis matches the extension of the first graphic element; and the width of the space shrinks and the extension of the first graphic element and the extension of the second graphic element shrink in unison as the value of the distance decreases.

* * * * *